Figure 2:
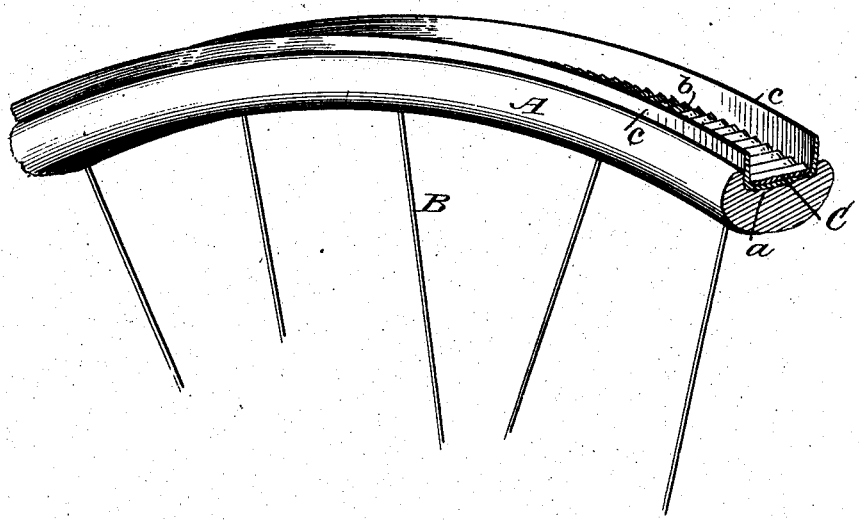
Figure 2:
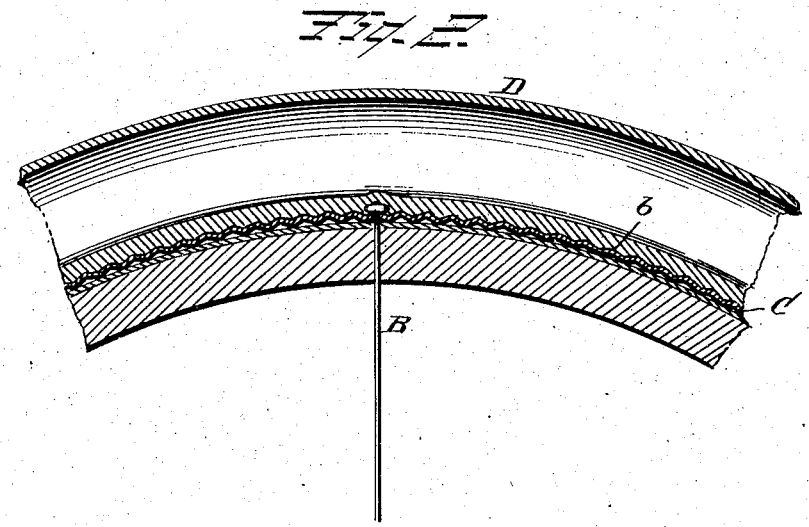

No. 781,262. PATENTED JAN. 31, 1905.
Z. XEVERS.
VEHICLE WHEEL.
APPLICATION FILED JUNE 24, 1904.

2 SHEETS—SHEET 1.

Witnesses
C. J. Williamson
M. E. Moore

Inventor
Zachariah Xevers.
By Chas. H. Fowler
Attorney

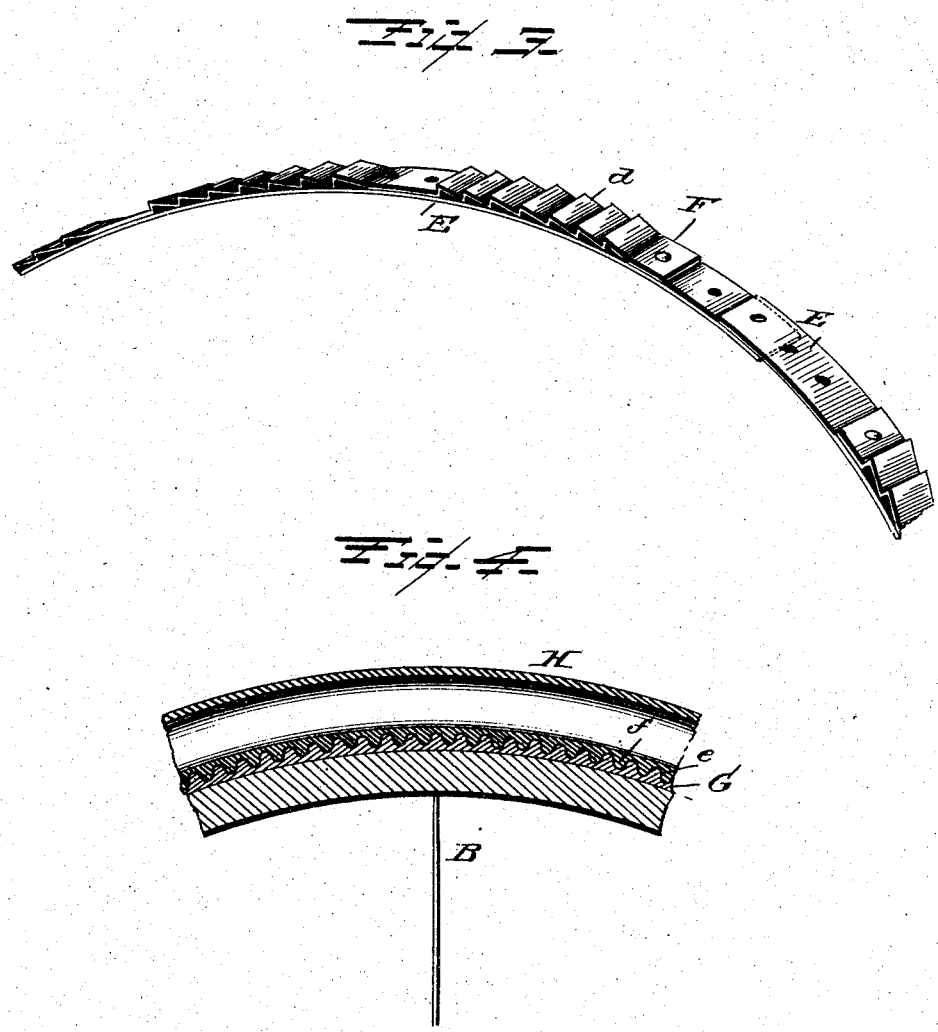

No. 781,262. Patented January 31, 1905.

UNITED STATES PATENT OFFICE.

ZACHARIAH XEVERS, OF SANTA CRUZ, CALIFORNIA.

VEHICLE-WHEEL.

SPECIFICATION forming part of Letters Patent No. 781,262, dated January 31, 1905.

Application filed June 24, 1904. Serial No. 213,944.

*To all whom it may concern:*

Be it known that I, ZACHARIAH XEVERS, a citizen of the United States, residing at Santa Cruz, in the county of Santa Cruz and State of California, have invented certain new and useful Improvements in Bicycle and Vehicle Wheels; and I do hereby declare that the following is a full, clear, and exact description of the same, reference being had to the annexed drawings, making a part of this specification, and to the letters of reference marked thereon.

The present invention has for its object to provide means for securely holding the rubber tires on the rims of bicycle and other vehicle wheels, whereby the danger of the tire becoming loose or slipping off is entirely prevented, which object is attained by the construction substantially as shown in the drawings and hereinafter described and claimed.

Figure 1 of the drawings is a sectional perspective view of a portion of the rim of a vehicle-wheel embodying my invention; Fig. 2, a longitudinal section thereof and rubber tire applied; Fig. 3, a perspective view of the support for the rubber tire, showing a modification thereof; Fig. 4, a sectional detail view showing an additional modification.

In the accompanying drawings, A represents a portion of the rim of a vehicle-wheel with spokes B connecting therewith, said rim having the channeled seat *a*, in which is seated and suitably connected thereto a transversely-corrugated seat C, the teeth or corrugations *b* being of any suitable form and construction found most preferable. The corrugated seat C has upwardly-extending flanges *c*, against which abuts the sides of the rubber tire D, (shown in Fig. 2 of the drawings,) the under side of the tire being pressed into the corrugations of the seat C, thus preventing the tire slipping in any direction and being held firmly on the rim of the wheel.

The flanges *c* of the corrugated seat C may be dispensed with if found preferable, and when used the flanges may be made separately or integral with the seat, this being left to the judgment of the manufacturer, as I do not wish to be confined to the exact construction shown, as it is evident that many changes or modifications may be resorted to without in any manner departing from the principle of the invention.

In Fig. 3 of the drawings is shown a corrugated seat of somewhat different construction than that illustrated in Figs. 1 and 2 and in which E designates the seat, which may be made in sections suitably connected together and having secured thereto sections F of corrugations in the form of ratchet-teeth, which are secured to the seat-sections, thereby enabling the sections of corrugations and sections of the seat to be conveniently connected together as required for the size of wheel used, or the sections of corrugations may be fastened directly to the tire, as found desirable.

In Fig. 4 is shown a transverse corrugated seat G, connected directly to the rim of the wheel, and the rubber tire H, formed with corresponding corrugations *f* to fit in the corrugations *e* of the seat when the tire is inflated or filled with air.

In providing a corrugated seat to hold the tire upon the rim the use of cement is entirely dispensed with, the tire being held securely in place and prevented from slipping sidewise or back and forth without the aid of additional fastenings.

Although I have shown upwardly-extending guard-flanges as an addition to the corrugated seat, it is evident that such flanges may be dispensed with, particularly when the corrugated seat is used on such rims as have the guard-flanges formed of the wood of the rim, and any form of corrugations of teeth either sharp or rounded or otherwise constructed and still come within the scope of the invention.

Any such changes in the several details of construction as would come within ordinary mechanical judgment may be made without departing from the essential features of the invention and is equally applicable to bicycle-wheels, wheels of automobiles, and all classes of vehicle-wheels where a rubber tire is used.

Having now fully described my invention, what I claim as new, and desire to secure by Letters Patent, is—

1. The combination with a rim having a channeled seat about its periphery, of a channeled metallic strip and a corrugated seat confined within said channeled strip and the whole confined within said channeled seat and having flanges extended above the rim and against which the sides of the tire are designed to abut.

2. A rim having a channeled seat about its periphery, a channeled metallic strip and a corrugated seat confined within said channeled strip and the whole confined within said channeled seat and having upwardly-extending flanges, combined with a tire having corrugations to engage those of the seat and its edges abutting against said flanges, as and for the purpose specified.

3. A rim for vehicle-wheels having a metallic seat and a transversely-corrugated seat formed in sections and suitably connected to said seat and the latter connected to the rim, substantially as and for the purpose set forth.

In testimony whereof I affix my signature in presence of two witnesses.

ZACHARIAH XEVERS.

Witnesses:
A. S. McCORMICK,
JOHN SCULLY.